United States Patent
Samejima et al.

(10) Patent No.: US 6,973,768 B2
(45) Date of Patent: Dec. 13, 2005

(54) MID-MOUNT MOWER HAVING A MOWER UNIT DISPOSED BETWEEN FRONT AND REAR WHEELS

(75) Inventors: Kazuo Samejima, Sakai (JP); Yoshikazu Togoshi, Sakai (JP); Osami Fujiwara, Sakai (JP); Yoshiyuki Esaki, Sakai (JP); Akira Minoura, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/649,330

(22) Filed: Aug. 26, 2003

(65) Prior Publication Data

US 2004/0154274 A1     Aug. 12, 2004

(30) Foreign Application Priority Data

Feb. 7, 2003     (JP) .............................. 2003-031115

(51) Int. Cl.⁷ ......................... A01D 67/00; A01D 34/00
(52) U.S. Cl. ..................................... 56/16.7
(58) Field of Search .................. 56/14.7, 14.9, 56/15.1, 15.2, 15.3, 15.9, 16.7, 17.2, DIG. 22; 180/208, 216; 280/48.13, 289

(56) References Cited

U.S. PATENT DOCUMENTS

| 4,321,783 A | * | 3/1982 | Kawasaki et al. ........... 56/15.8 |
| 5,465,940 A | * | 11/1995 | Guzman et al. ............ 254/423 |
| 5,475,971 A | | 12/1995 | Good et al. |
| 6,053,477 A | * | 4/2000 | Price ........................... 254/94 |
| 6,330,997 B2 | * | 12/2001 | McGlaun et al. ............. 254/94 |
| 6,516,597 B1 | | 2/2003 | Samejima et al. |
| 2002/0157369 A1 | | 10/2002 | Fontanes, II et al. |
| 2003/0019199 A1 | * | 1/2003 | Fontanes et al. ............. 56/16.7 |

FOREIGN PATENT DOCUMENTS

| JP | 2000-342040 | 12/2000 | |
| JP | 2000342040 A | * 12/2000 | .......... A01D 34/64 |

* cited by examiner

Primary Examiner—Árpád Fábián Kovács
(74) Attorney, Agent, or Firm—The Webb Law Firm

(57) ABSTRACT

A mid-mount mower having a body frame supported above the ground by front wheels and rear wheels, the body frame having a front cross frame in a forward portion thereof with respect to a longitudinal direction of a vehicle body, and a mower unit disposed between the front wheels and rear wheels. A main jack body is mounted on the front cross frame to be pivotable about a pivot shaft extending longitudinally of the vehicle body. The main jack body is in a storage position extending along the front cross frame when pivoted to a first pivot position about the pivot shaft, and in a substantially vertical position relative to the ground when pivoted to a second pivot position about the pivot shaft. The main jack body has a controlled portion exposed upward when the main jack body is in the vertical position. The main jack body is extendible and contractible, in the vertical position relative to the ground, to raise and lower the front cross frame when an operating force is applied through a control device engaged with the controlled portion of the main jack body.

15 Claims, 11 Drawing Sheets

MID-MOUNT MOWER HAVING A MOWER UNIT DISPOSED BETWEEN FRONT AND REAR WHEELS

BACKGROUND OF THE INVENTION

1. Field of the Invention

This invention relates to a mid-mount mower having a mower unit disposed between front wheels and rear wheels. More particularly, the invention relates to a mid-mount mower having a function for jacking up a front portion of a vehicle body to expose a blade-equipped plane of a mower unit.

2. Description of the Related Art

In a conventional mid-mount mower noted above, it is necessary to raise the front portion of the vehicle body and expose the inside of the mower unit for inspection and maintenance of interior parts of the mower unit kept mounted on the vehicle body. For this purpose, the mid-mount mower known from U.S. patent application published under No. 2002/0157369 has a jack member pivotably switchable between a storage position retracted toward the vehicle body and an operative position extended forwardly and downwardly of the vehicle body. When switched to the operative position, the jack member is vertically pivotable about its connection to the vehicle body, with a toothed portion formed on the extreme end of the jack member engaging the ground. As the vehicle moves forward with the jack member switched to the operative position, the jack member in the operative position pivots about the toothed portion thereof to an erected posture. This raises the front portion of the vehicle body, thereby exposing the inside of the mower unit.

However, in order to raise the front part of the vehicle body, the operator has to drive the vehicle so as to ride on the jack member that pivots to the erected posture as the vehicle moves forward. Such an operation often arouses a sense of uneasiness in the operator.

A height to which the front of the vehicle body is raised is determined by an angle of pivotal movement of the jack member to the erected posture attained by movement of the vehicle body. Thus, a severe control is required to raise the front of the vehicle body by a desired amount. When the operator fails to stop the vehicle in an appropriate position, the jack member or adjacent components may be damaged due to overloading. In order to avoid this situation, the jack member must be strong enough to endure such load. To secure sufficient strength, the jack member has to be formed of an expensive material or provided with a reinforcement. This will lead to a cost increase or a complicated structure. Further, the toothed portion thrusting into the ground and acting as a pivot for the jack member in time of raising the vehicle body may badly injure the ground surface, which in many cases is turf.

In the mid-mount mower known from Japanese Patent Publication Kokai No. 2000-342040, a transverse support frame having caster-type front wheels attached to opposite ends thereof is connected in a middle position to a vehicle body to be pivotable about a longitudinal axis, and a jack device is disposed between the vehicle body and the front-wheel support frame. When this jack device operates, the front-wheel support frame pivots upward about one of the right and left front wheels to raise the front part of the vehicle body, thereby exposing the inside of the mower unit.

This jack device raises the front of the vehicle body by an upward pivotal movement of the front-wheel support frame about the longitudinal axis using one of the right and left front wheels as a fulcrum. As a result, the vehicle body could become unstable when raised, and the mower should be parked on as level a surface as possible.

In both of the prior art examples noted above, the upward pivotal movement of the jack member or the front-wheel support frame raises the front part of the vehicle body. As a result, the jack member or the front-wheel support frame must be strengthened enough to endure a bending force generated in time of raising the vehicle body. For this purpose, it may be necessary to use an expensive material or provide a reinforcing member, which will lead to a cost increase or a complicated structure.

SUMMARY OF THE INVENTION

The object of this invention is to provide a mower with a function of raising a vehicle body easily while suppressing a cost increase and a structural complication, relieving the operator from a sense of uneasiness, and avoiding serious damage to the ground.

The above object is fulfilled, according to this invention, by a mid-mount mower comprising a body frame supported above the ground by the front wheels and rear wheels, the body frame having a front cross frame in a forward portion thereof with respect to a longitudinal direction of a vehicle body, and a main jack body mounted on the front cross frame to be pivotable about a pivot shaft extending longitudinally of the vehicle body, the main jack body being in a storage position extending along the front cross frame when pivoted to a first pivot position about the pivot shaft, and in a substantially vertical position relative to the ground when pivoted to a second pivot position about the pivot shaft, the main jack body being extendible and contractible, in the vertical position relative to the ground, to raise and lower the front cross frame when an operating force is applied to a controlled portion of the main jack body.

In the mower as noted above, the front of the vehicle body may be raised by switching the jack from the storage position to the operative position and extending the jack. As a result, the inside of the mower is exposed to allow a maintenance operation, such as cleaning the inside of the mower deck or changing the blades, to be carried out easily without the trouble of detaching the mower unit from the vehicle body. Since the front of the vehicle body is raised by extending the main jack body vertically erected, the vehicle body may be raised in a stable, well-balanced position with little shifting of the center of gravity of the vehicle body. Further, in such a raising operation, only a load in a jack-extending direction, i.e. vertical direction or substantially vertical direction, is applied to the ground, and the ground surface contacted by the main jack body is subject to little damage. As the main jack body does not undergo a strong bending force when raising the vehicle body, the structure thereof may be simplified. Furthermore, as the main jack body is stored in a transverse position extending along a transverse front frame, the main jack body is not obstructive to a running or grass cutting operation.

In a preferred embodiment of this invention, the controlled portion is upwardly exposed when the main jack body is in the vertical position relative to the ground, and a control device is provided for engaging the upwardly exposed controlled portion of the main jack body. A brake pedal is disposed in a forward portion of the body frame to be movable between a braking position and a non-braking position, and a lock device is provided for holding the brake pedal in the braking position. The brake pedal in the non-braking position blocks operation of the control device engaged with the controlled portion of the main jack body in the vertical position relative to the ground. With this construction, only when the brake pedal is held in the braking position by the lock device to produce what is called a parking state, the jack control device may be turned to raise the front of the running vehicle. This prevents an inadvertent movement of the vehicle body caused by neglecting to put on the brakes, when the front part of the vehicle body is raised by the jack.

The control device separated from the main jack body may be held by the front cross frame to retain the main jack body in the storage position inside the front cross frame. Then, there is no need to provide a retaining device dedicated to retaining of the main jack body in the storage position. Further, when the main jack body is stored after the control device is separated therefrom, the control device also is reliably held by the front cross frame.

A mid-mount mower according to the invention includes right and left stepless transmissions disposed in a rearward portion of the body frame with respect to the longitudinal direction of the vehicle body for changing speed of and transmitting engine output independently to the right and left rear wheels, right and left shift levers disposed around the driver's seat for controlling the right and left stepless transmissions, a brake pedal disposed in a forward portion of the body frame to be movable between a braking position and non-braking position, and a lock pedal for holding the brake pedal in the braking position, wherein the brake pedal and the lock pedal are arranged side by side around a central area of the cross frame.

When braking the vehicle body, the operator may operate the brake pedal with his or her foot while holding the right and left shift levers with both hands. When parking the vehicle body, the operator may operate the brake pedal with his or her foot, while holding the right and left shift levers with both hands, to stop the vehicle body, and then operate the lock pedal with the other foot to hold the brake pedal in the braking position. On the other hand, when the starting the vehicle body again, the operator may operate the brake pedal or the lock pedal to release the brake pedal from the braking position with one foot, further operate the brake pedal with the same foot or the other foot to release the vehicle body from its braked condition, and then operate the shift levers with both hands from neutral positions to desired running positions.

That is, when braking the vehicle, parking the vehicle or starting the vehicle again, the operator does not need to change his or her grips on levers, as required with a construction in which levers are used to brake or park the vehicle body. It is therefore easy to make a quick response to a need for an emergency braking operation. Further, the operator may bring the vehicle body into a parking state or running state quickly by a series of operations without changing his or her grips on the levers. This eliminates the possibility of a wrong operation caused by an inadvertent contact or knock made by the operator when changing the grips on the levers.

Further, where the brake pedal and the lock pedal are arranged close to each other and side by side, the connecting structure for permitting the lock pedal to hold the brake pedal may be simplified. Since the lock pedal is operated by a foot, its juxtaposition with the brake pedal at the operator's feet does not impair operability.

Other features and advantages of the invention will be apparent from the following description of a preferred embodiment to be taken with reference to the drawings.

DESCRIPTION OF THE PREFERRED EMBODIMENTS

Figure 1:
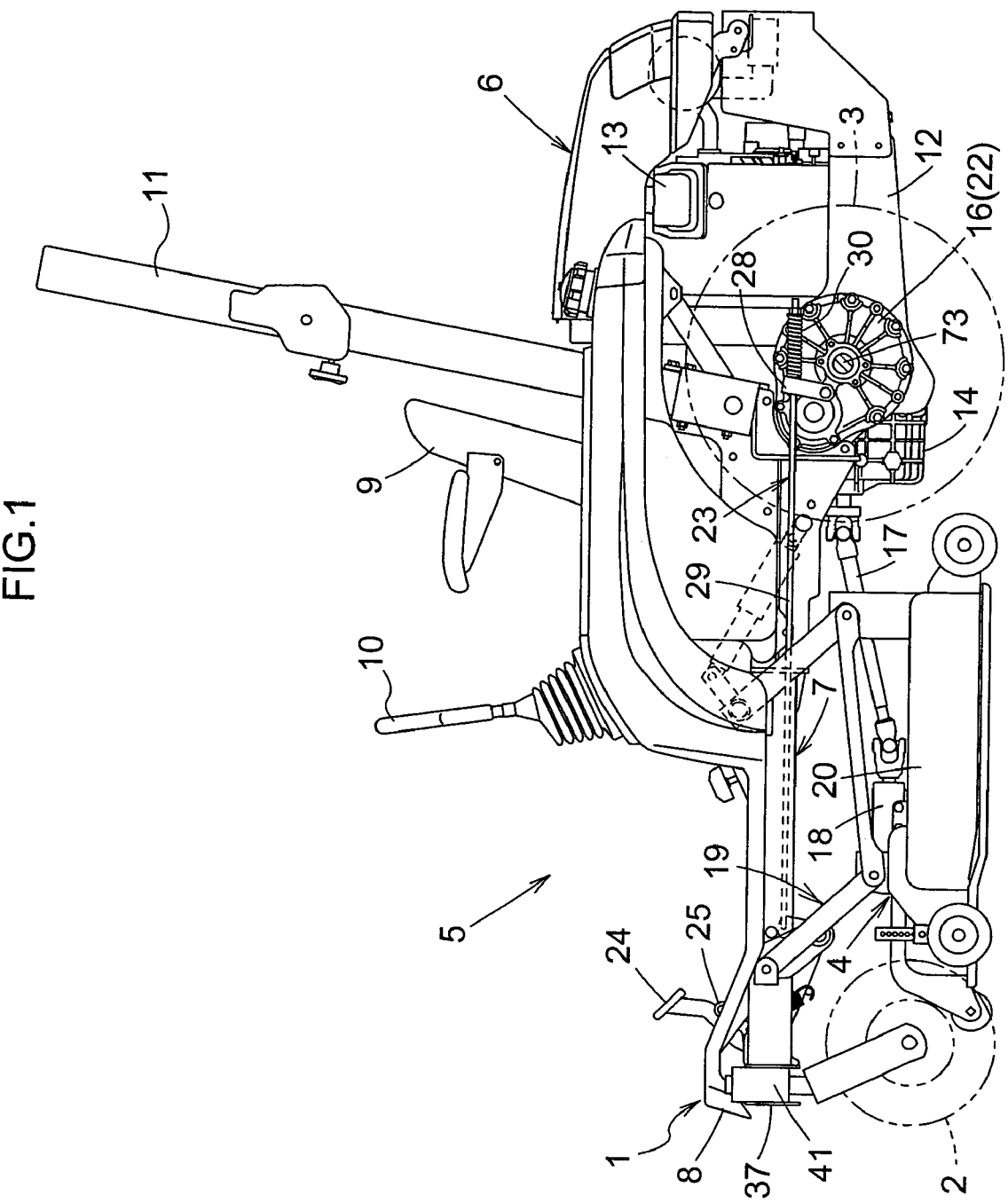
FIG. 1 is a side elevation of a mower.
Figure 2:
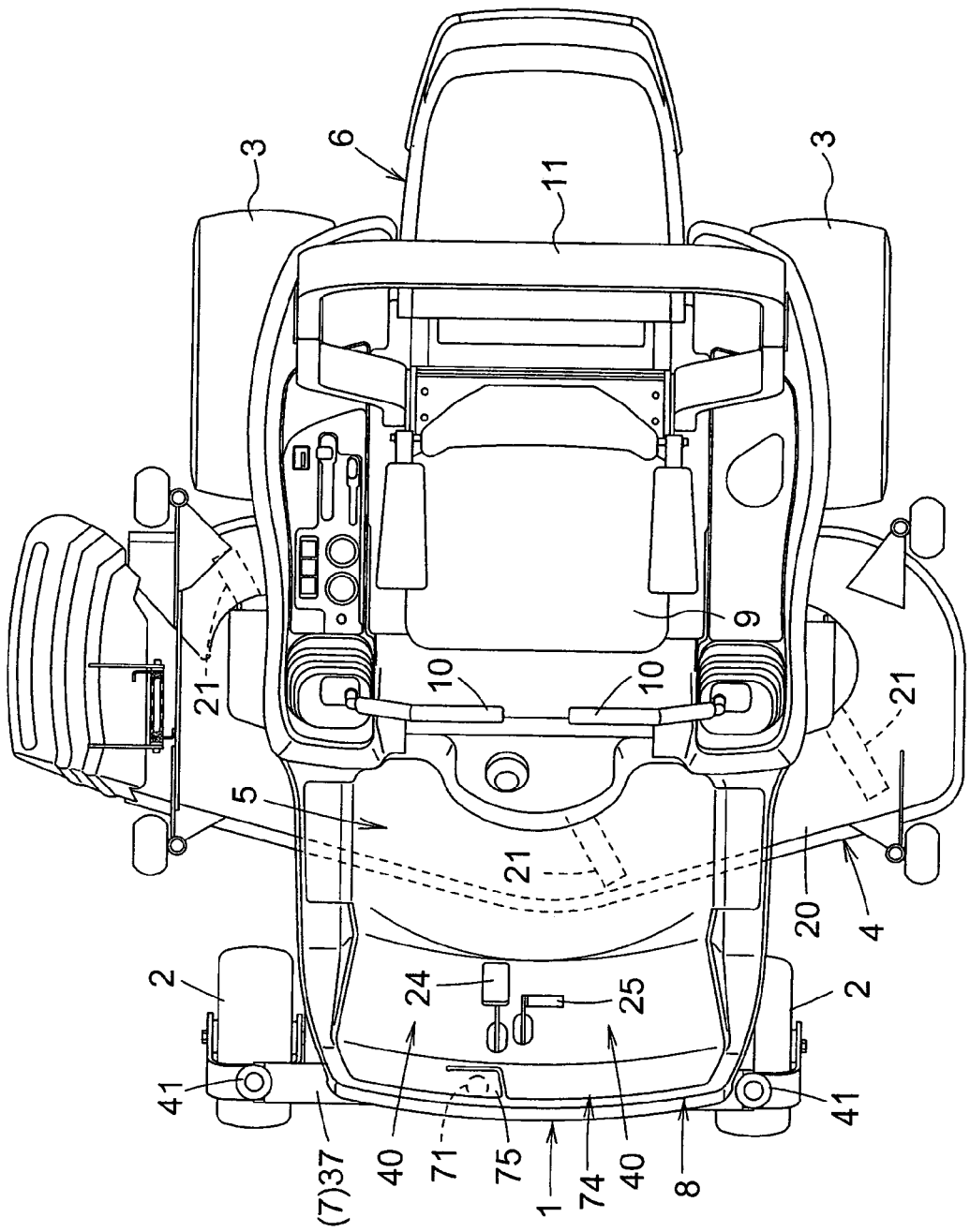
FIG. 2 is a plan view of the mower.

FIG. 1 shows a side elevation of a riding mid-mount mower. FIG. 2 shows a plan view of the mower. The mower includes a vehicle body 1 having a pair of right and left caster-type front wheels 2 arranged in front positions thereof to be swivelable about vertical axes. and a pair of right and left rear wheels 3 arranged in rear positions to act as drive wheels. This mower is constructed as the mid-mount type with a vertically movable mower unit 4 mounted between the front wheels 2 and rear wheels 3.

Figure 3:
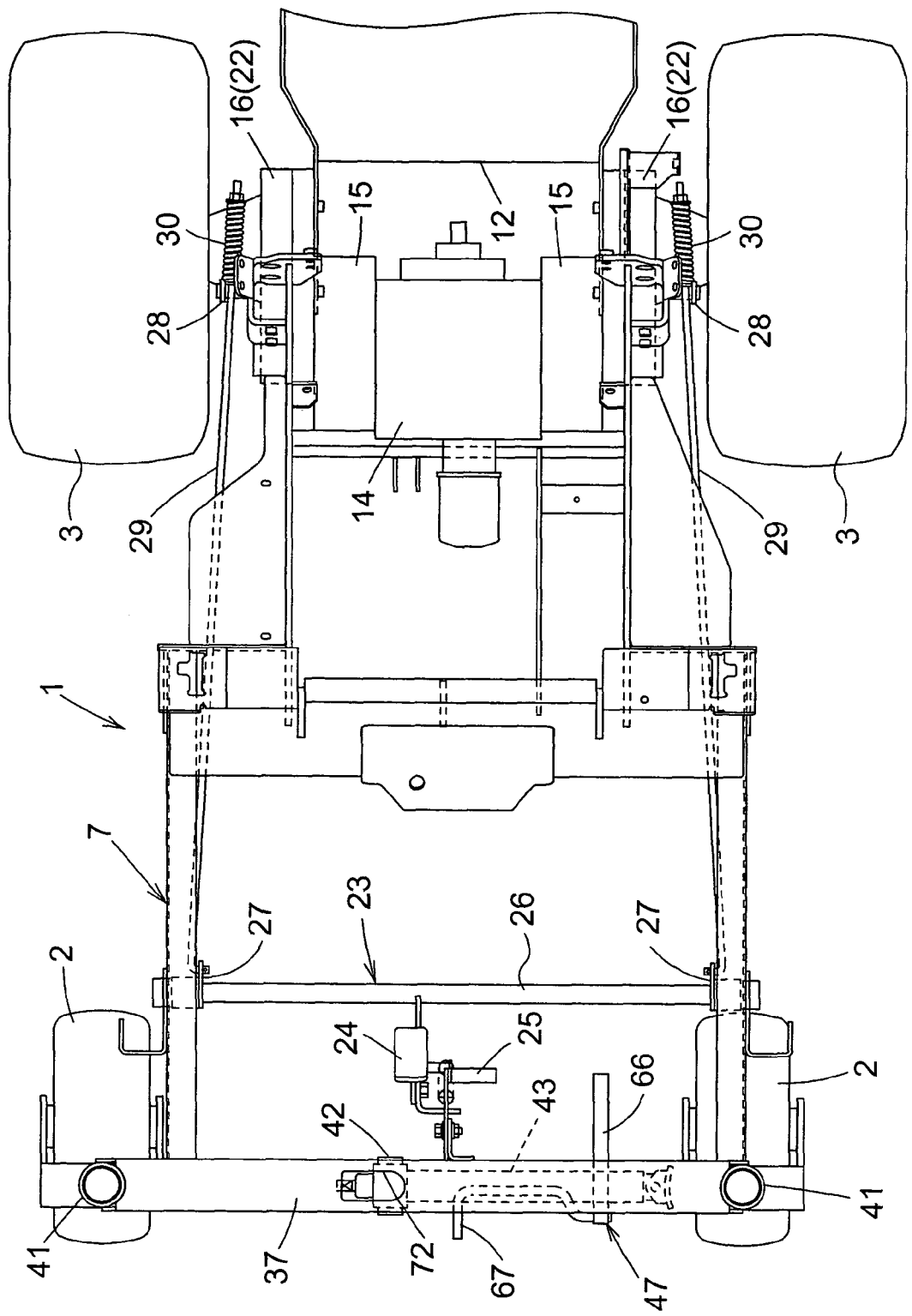
FIG. 3 is a plan view of a forward portion of a vehicle body showing a braking control structure.
Figure 4:
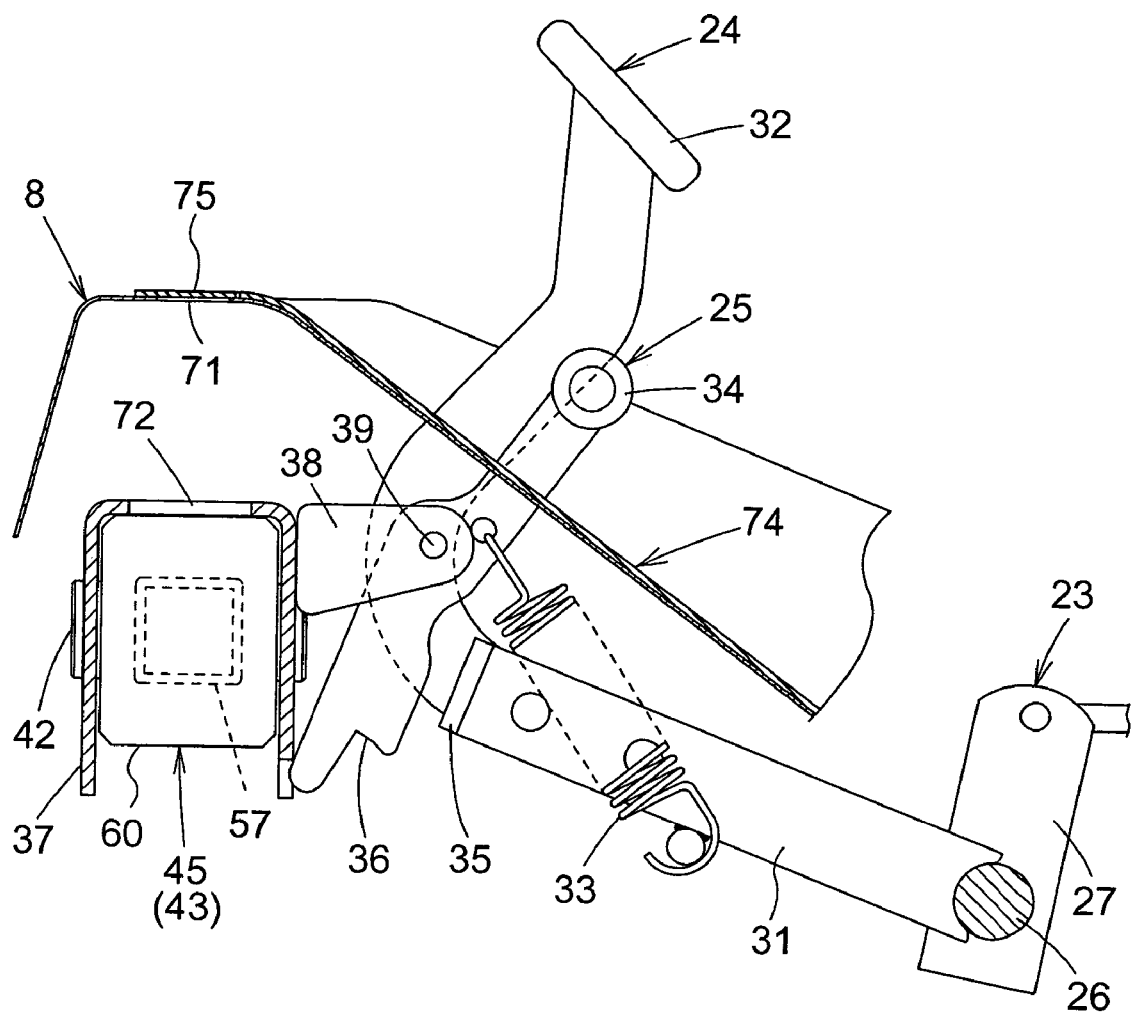
FIG. 4 is a side view, in vertical section, of a principal portion showing a brake pedal in a release position.

As shown in FIGS. 1 through 3, the vehicle body 1 has a driving platform 5 disposed in a forward portion thereof, and a motor section 6 disposed in a rearward portion. The driving platform 5 includes a boarding step 8 disposed on a front part of a body frame 7, an operator's seat 9 disposed in a rear part of the body frame 7, shift levers 10 pivotably arranged at right and left sides of the operator's seat 9, a rollover protective frame 11 erected on the body frame 7 rearwardly of the operator's seat 9.

The motor section 6 includes an air-cooled engine 13 mounted on an engine frame12 positioned rearwardly of the body frame 7, a transmission device 14 disposed forwardly and downwardly of the engine 13, a pair of hydrostatic stepless transmissions 15 arranged at opposite sides of the transmission device 14, right and left reduction devices 16 extending between the corresponding hydrostatic stepless transmissions 15 and the right and left rear wheels 3. Drive is transmitted from the engine 13 to the transmission device 14. In the transmission device 14, the drive is divided into right and left propelling drives and a working drive. The right and left propelling drives from the transmission device 14 are changed in speed by the corresponding hydrostatic stepless transmissions 15, and are transmitted to the corresponding right and left rear wheels 15 through the right and left reduction devices 16. The working drive from the transmission device 14 is transmitted to a transmission 18 of the mower unit 4 through a transmission shaft 17.

In the motor section 6, the right and left reduction devices 16 also serve as relay frames for connecting the body frame 7 and the engine frame 12, while the transmission device 14 and the pair of hydrostatic stepless transmissions 15 also serve as intermediate frames for connecting the right and left reduction devices 16.

In the vehicle body 1, the right and left shift levers 10 are interlocked to the hydrostatic stepless transmissions 15. The right and left shift levers 10 are rockable to control the corresponding hydrostatic stepless transmissions 15 independently to change the speed of drive for transmission to the corresponding right and left rear wheels 3.

The vehicle body 1 may be placed in various states by controlling the right and left shift levers 10 to independently operate the hydrostatic stepless transmissions 15. These states include a standstill in which the transmission of drive to the right and left rear wheels 3 is stopped, a straight running state in which forward or backward drive is transmitted at the same speed to the right and left rear wheels 3, a large turn state in which forward or backward drive is transmitted at different speeds to the right and left rear wheels 3, a pivot turn state in which the transmission of drive to one of the right and left rear wheels 3 is stopped while transmitting forward or backward drive to the other of the right and left rear wheels 3, and a spin turn state in which forward drive is transmitted to one of the right and left rear wheels 3 while transmitting backward drive to the other of the right and left rear wheels 3.

The mower unit 4 includes three grass-cutting blades 21 arranged in a housing 20 suspended from the body frame 7 through a linkage mechanism 19. The three blades 21 are driven by the working drive transmitted from the transmission 18 disposed above to rotate at a constant speed about vertical axes thereof. The three blades 21 are arranged sideways with partially overlapping tracks of rotation, and rotatable in the same direction so that the left blade 21 rotates backward and the right blade 21 rotates forward in the overlapping areas. Thus, the mower unit 4 cuts grass by rotating each of the these blades 21, while discharging grass clippings through an outlet formed in the right side portion of the housing 20, with the help of carrier winds generated by the rotating blades.

As shown in FIGS. 1 through 7, the boarding step 8 on the vehicle body 1 has, in a transversely middle front position thereof, a single brake pedal 24 interlocked through a link mechanism 23 to a braking mechanism 22 mounted in each of the right and left reduction devices 16, and a lock pedal 25 which is an example of locking device for holding the brake pedal 24 in a braking position. The two pedals are arranged side by side, with the brake pedal 24 on the right and the lock pedal 25 on the left.

The link mechanism 23 includes a transverse shaft 26 supported by the body frame 7 to be rotatable about a transverse axis, right and left control rods 29 extending between linking arms 27 fixed to the right and left ends of the shaft 26 and corresponding control arms 28 of the braking mechanisms 22, and coil springs 30 mounted on rear parts of the respective control rods 29. The linking mechanism 23 actuates the right and left braking mechanisms 22 in response to a depression of the brake pedal 24 about the axis of the shaft 26 from a non-braking position, to provide a braking condition in proportion to an amount of pedal depression.

The brake pedal 24 has a proximal portion 31 extending from the shaft 26 of the linking mechanism 23 and a control portion 32 extending from this proximal portion 31. The brake pedal 24 is biased to return to the non-braking position by a coil spring 33 extending from the proximal portion 31 to the lock pedal 25.

The lock pedal 25 has a control portion 34 at the upper end thereof and an engaging portion 36 for engaging an engaged portion 35 formed on the proximal portion 31 of the brake pedal 24. The lock pedal 25 is supported, through a transverse shaft 39, by a bracket 38 attached to a transversely extending front frame 37 of the body frame 7. The lock pedal 25 is pivotable about the shaft 39 like a seesaw, and, by means of the coil spring 33 noted above, the engaging portion 36 thereof is normally separated from the engaged portion 35 of the brake pedal 24. Thus, the lock pedal 25 is biased to return to an unlock position where the lower end thereof abuts on the front frame 37, and is held immovable from the unlock position to the locking position. The brake pedal 25 is allowed to move from the unlock position to the locking position only when the brake pedal 24 is depressed to its lower limit.

By depressing the brake pedal 24 to its lower limit, the lock pedal 25 is allowed to move from the unlock position to the locking position. The lock pedal 25 is operated to the locking position, and the brake pedal 24 is released. Then, the engaging portion 36 of the lock pedal 25 engages the engaged portion 35 of the brake pedal 24. Such engaging condition is kept by the bias force from the coil spring 33, whereby the brake pedal 24 is kept in the braking position and the lock pedal 25 in the locking position.

When, with the brake pedal 24 held in the braking position and the lock pedal 25 in the locking position, the brake pedal 24 is depressed, the engaged portion 35 of the brake pedal 24 is separated from the engaging portion 36 of the lock pedal. This releases the brake pedal 24 and the lock pedal 25 from the mutual engagement. Further, the bias force from the coil spring 33 biases the lock pedal 25 to return to the unlock position from the locking position and biases the brake pedal 24 to return to the non-braking position following the release of the brake pedal 24.

With the above construction, when braking the vehicle body 1, the operator simply steps on the brake pedal 24 with his or her right foot, while holding the right and left shift levers 10 with both hands, to produce a braking state in proportion to an amount of depression. When parking the vehicle body 1, the operator depresses the brake pedal 24 to the braking position with his or her right foot to stop the vehicle body 1 while holding the right and left shift levers with both hands, then moves the lock pedal 25 from the unlock position to the locking position with his or her left foot and releases the brake pedal 24. This produces a parking state with the brake pedal held in the braking position, and releases the brake pedal 24 to release the vehicle body 1 from the braking state, and then shifts the shift levers 10 with both hands from the neutral positions to desired positions to bring the vehicle into a running condition according to shift positions of the right and left shift levers 10.

That is, when producing the braking state, parking state, or running state from the parking state, the operator does not need to change his or her grips on levers, as required with a construction in which levers are used to produce the braking or parking state of the vehicle body 1. It is therefore easy to make a quick response to a need for an emergency braking operation. Further, the operator may bring the vehicle body 1 into the parking state or running state quickly by a series of operations without changing his or her grips on the levers. This eliminates the possibility of a wrong operation caused by an inadvertent contact or knock made by the operator when changing the grips on the levers.

Further, since the brake pedal 24 and lock pedal 25 are arranged close to each other and side by side, it becomes possible to simplify the linking structure for enabling the lock pedal 25 to hold the brake pedal 24 in the braking position. Furthermore, since the brake pedal 24 and lock pedal 25 are arranged side by side in the transversely middle position of the front portion of the boarding step 8, the operator does not need to take an unnatural posture like twisting the lower half of his or her body toward the pedals, relative to the upper half, as where the brake pedal 24 and the lock pedal 25 are arranged side by side on either transversely rightward or leftward part of the boarding step 8. In addition, large footrest spaces are secured on transversely right and left parts 40 of the boarding step 8 serving as footrests to receive the operator's feet naturally during operation and also serving as a footboard when the operator boards or alights from the vehicle.

As shown in FIGS. 3 through 11, the front frame 37 has a U-shaped section opening downward, and bosses 41 respectively attached to the right and left ends thereof to support the front wheels 3 to be swivelable about vertical axes.

The front frame 37 is provided with a jack 43 pivotable, about the axis of a longitudinal shaft 42 disposed in a transversely middle position thereof, to switch between a storage position to extend along the front frame 37 and an operative position erected vertically. The jack 37 is contained in the front frame 37 when switched to the storage position, and is extendible and contractible when switched to the operative position.

The jack 43 includes a main body having a rocking leg 44 pivotable about the axis of the shaft 42, a sliding leg 45 slidable under guiding action of the rocking leg 44, and a controlled portion 46 for sliding this sliding leg 45. The jack 43 includes also a control device 47 detachably connected to the controlled portion 46.

The rocking leg 44 includes a pivot member 48 mounted on the support shaft 42, and a leg member 49 formed of square pipe and extending from the pivot member 48. The pivot member 48 has a lock pin 52 for engaging a first lock bore 50 formed in the front frame 37 to hold the jack 43 in the storage position, and for engaging a second lock bore 51 formed in the front frame 37 to hold the jack 43 in the operative position. The lock pin 52, while being biased by a coil spring 53 for engagement, is moved in a lock-releasing direction against the biasing force of the coil spring 53 by a control arm 54 disposed rearward. Further, the lock pin 52 is blocked from moving in the lock-releasing direction by a spring-receiving pin 55 disposed an intermediate position thereof and engageable with a recess 56 formed in the pivot member 48.

The sliding leg 45 includes a square pipe 57 slidably but not rotatably fitted in the leg member 49 of the rocking leg 44, a female screw 58 fixed to one end of the square pipe 57, and a ground engaging member 60 connected to the other end of the square pipe 57 through a shaft 59 to be pivotable fore and aft.

The controlled portion 46 includes a feed shaft 62 having a male screw 61 formed on one end thereof for engaging the female screw 58 of the sliding leg 45. The other end of the feed shaft 62 extends, in a direction perpendicular to the axis of the support shaft 42, through the support shaft 42 and the pivot member 48 of the rocking leg 44 mounted on the shaft 42. Further, the controlled portion 46 includes, attached to the protruding end thereof, a retainer member 65 having a retaining portion 63 for preventing the controlled portion 46 from falling off the support shaft 42 and pivot member 48, and a receiving portion 64 having a square section. Thus the support shaft 42 and pivot member 48 support the controlled portion 46 to be rotatable relative thereto about the axis of the feed shaft 62.

The control device 47 includes a square pipe 66 having one end thereof detachably mounted on the receiving portion 64 of the controlled portion 46, and a control handle 67 extending from the other end of the square pipe 66 in a direction perpendicular to the axis of the square pipe 66. When detached from the controlled-portion 46, the square pipe 66 may be inserted through a pair of front and rear square receiving bores 68 formed on the front frame 37. When inserted as above, the square pipe 66 receives and holds the free end of the jack 43 in its storage position in a manner that the ground engaging member 60 of the sliding leg 45 abuts on an upper inner surface of the front frame 37, while the control handle 67 is placed close along the lower end of the front frame 37. That is, the pair of front and rear receiving bores 68 formed on the front frame 37 act as a holding portion for holding the jack 43 in the storage position through the control device 47.

In addition, a thrust bearing 69 is disposed between the pivot member 48 of the rocking leg 44 and the feed shaft 62 of the controlled portion 46. A beta pin 70 is detachably attached to the square pipe 66 of the control device 47 in order to prevent the square pipe 66 from coming off the receiving bores 68 of the front frame 37. Further, openings 71, 72 are formed in the boarding step 8 and the front frame 37 in order to allow the control device 47 to be attached to the controlled portion 46 when the jack 43 is switched from the storage position to the operative position.

With the construction described above, when carrying out maintenance such as cleaning the inside of mower unit 4 or changing the blades 21, the operator stands in front of the vehicle body, and first of all, pulls the control device 47 of the jack 43 out of the receiving bores 68 of the front frame 37. Next, the operator disengages the lock pin 52 from the first lock bore 50 of the front frame 37 to switch the jack 43 from the storage position to the operative position, and insert the lock pin 52 into the second lock bore 51 of the front frame 37 to place the jack 43 in the operative position. The operator then mounts the control device 47 on the controlled portion 46 through the openings 71 and 72 of the boarding step 8 and front frame 37, turns the control device 47 about the axis of the controlled portion 46 so as to slide the sliding leg 45 downward with the help of screw-feeding action of the controlled portion 46. Then the jack 43 is extended to raise the front of the vehicle body 1 utilizing axles 73 of the rear wheels 3 as a fulcrum. Consequently, the mower unit 4 is raised at the front, forwardly exposing its interior, thereby eliminating the trouble of detaching the mower unit 4 from the vehicle body 1 and facilitating the maintenance of the inside of the mower unit 4.

After the maintenance, the operator turns the control device 47 about the axis of the controlled portion 46 to slide the sliding leg 45 upward with the help of screw-feeding action of the controlled portion 46. Then, the jack 43 is contracted to cancel the raising of the front side of the vehicle body 1 with the axles 73 of the rear wheels 3 acting as a fulcrum. After the cancellation of such raising, the operator removes the control device 47 from the controlled portion 46, disengages the lock pin 52 from the second lock bore 51 of the front frame 37, switches the jack 43 from the operative position to the storage position, engages the lock pin 52 in the first lock bore 50 of the front frame 37 to set the jack 43 to the storage position, then extends the control device 47 through the receiving bores 68 of the front frame 37, and retains it in place with the beta pin 70. Then the jack 43 may be held in the storage position stably without clattering. The control device 47 removed from the controlled portion 46 is stored in an inconspicuous location not to impair outward appearance. In addition, the control device 47 has little chance of being misplaced and lost.

Since the jack 43 in the storage position is contained in the front frame 37, the outward appearance is better than when the jack 43 is exposed. Further, the jack 43 in the storage position never obstructs the up-and-down operation of mower unit 4 by entering such operating zone.

Moreover, since the support shaft 42, serving as a pivot for the jack 43, is disposed in the transversely middle position of the front frame 37, the jack 43 is vertically erected in its operative position in the transversely middle position of the front frame 43. In the erected condition the jack 43 is extended and contracted to raise and lower the front of the vehicle body 1 utilizing the axles 73 of the rear wheels 3 as a fulcrum. Further, since the shaft 59 for connecting the ground engaging member 60 allows the jack 43 to tilt fore and aft with the vertical movement of the vehicle body 1, the front of the vehicle body 1 may be raised and lowered easily and speedily with a small force, in a well-balanced and stable condition and with little displacement of the center of gravity of the vehicle body 1.

As shown in FIGS. 2 and 4 through 8, the upper surface of the boarding step 8 is covered with an anti-slip rubber mat 74. The rubber mat 74 has a tongue portion 75 for covering the openings 71 and 72 of the boarding step 8 and the front frame 37 or for being rolled up to expose the openings 71 and 72. At normal times when the jack 43 is not used, the openings 71 and 72 of the boarding step 8 and the front frame 37 may be covered with the tongue portion 75, to avoid impairment of the outward appearance. When the jack 43 is used, the operator may simply roll up the tongue portion 75 to expose the openings 71 and 72 of the boarding step 8 and the front frame 37.

The control device 47 may be mounted on the controlled portion 46 through these openings 71 and 72 quickly.

In place of the tongue portion 75, a cap may be detachably mounted over the opening 71 of the boarding step 8, thereby covering the openings 71 and 72 of the boarding step 8 and the front frame 37.

Figure 5:
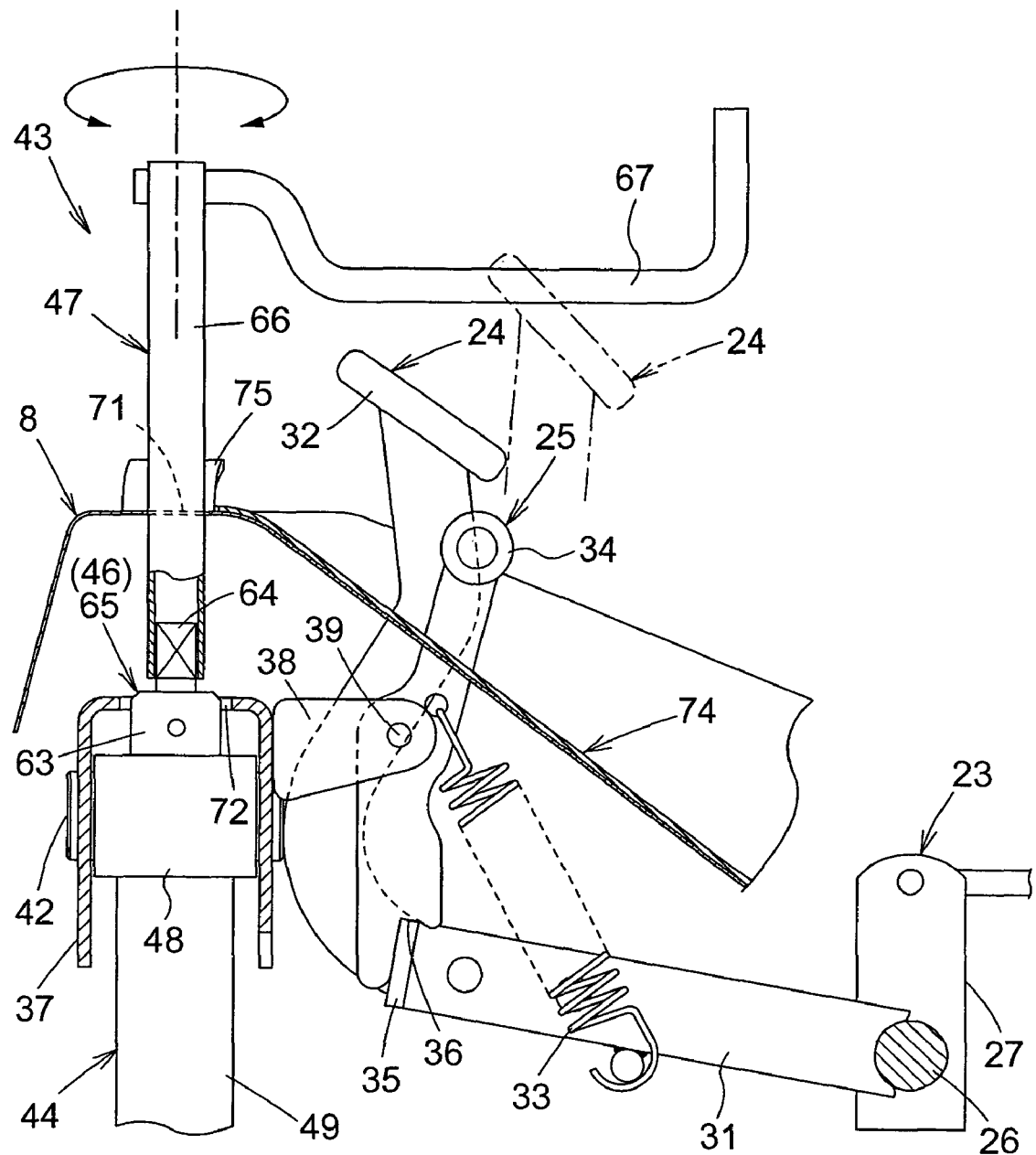
FIG. 5 is a side view, in vertical section, showing the principal portion showing the brake pedal held in a braking position.
Figure 6:
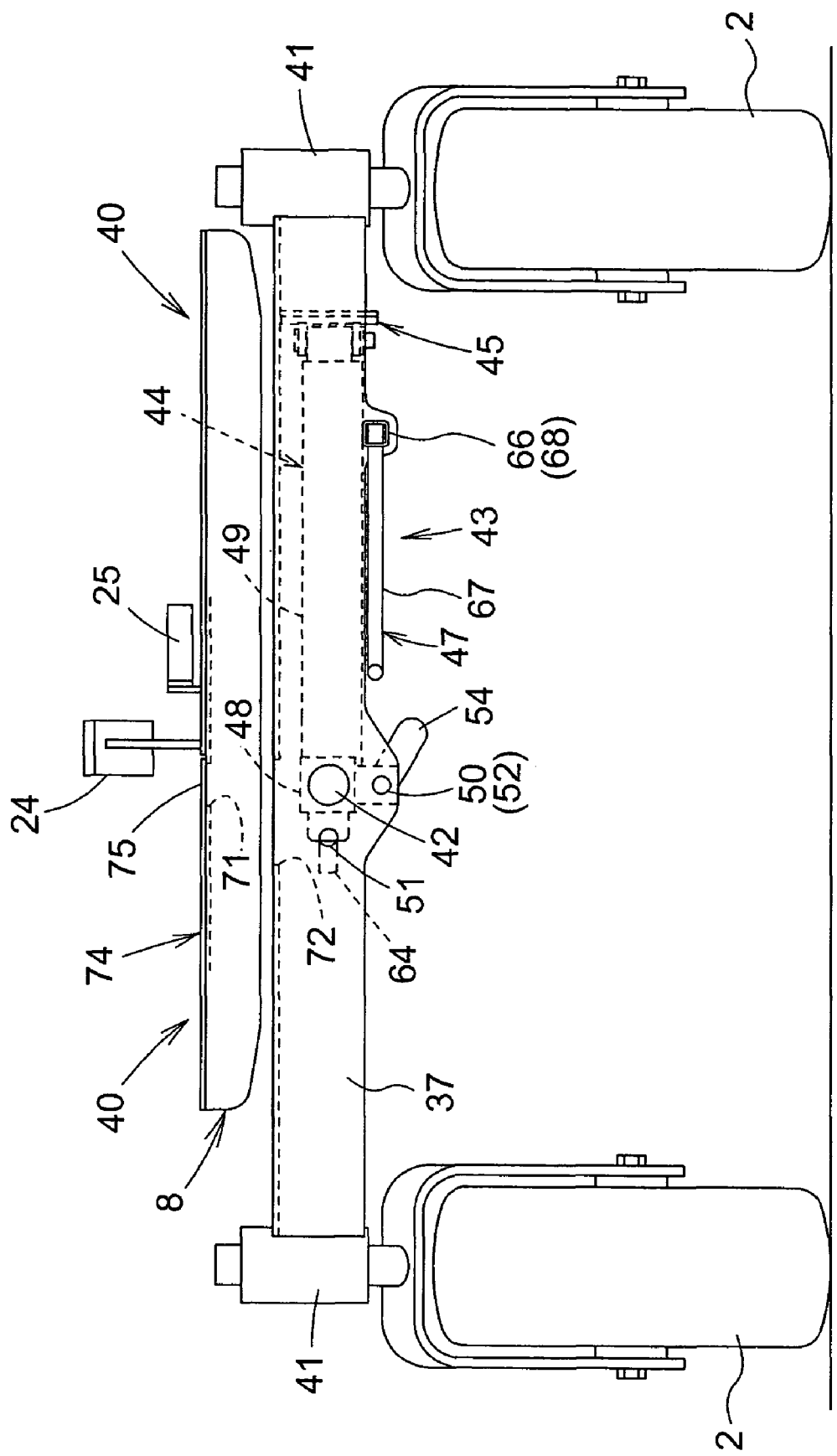
FIG. 6 is a front view showing a lower portion of the vehicle body with a jack held in a storage position.
Figure 7:
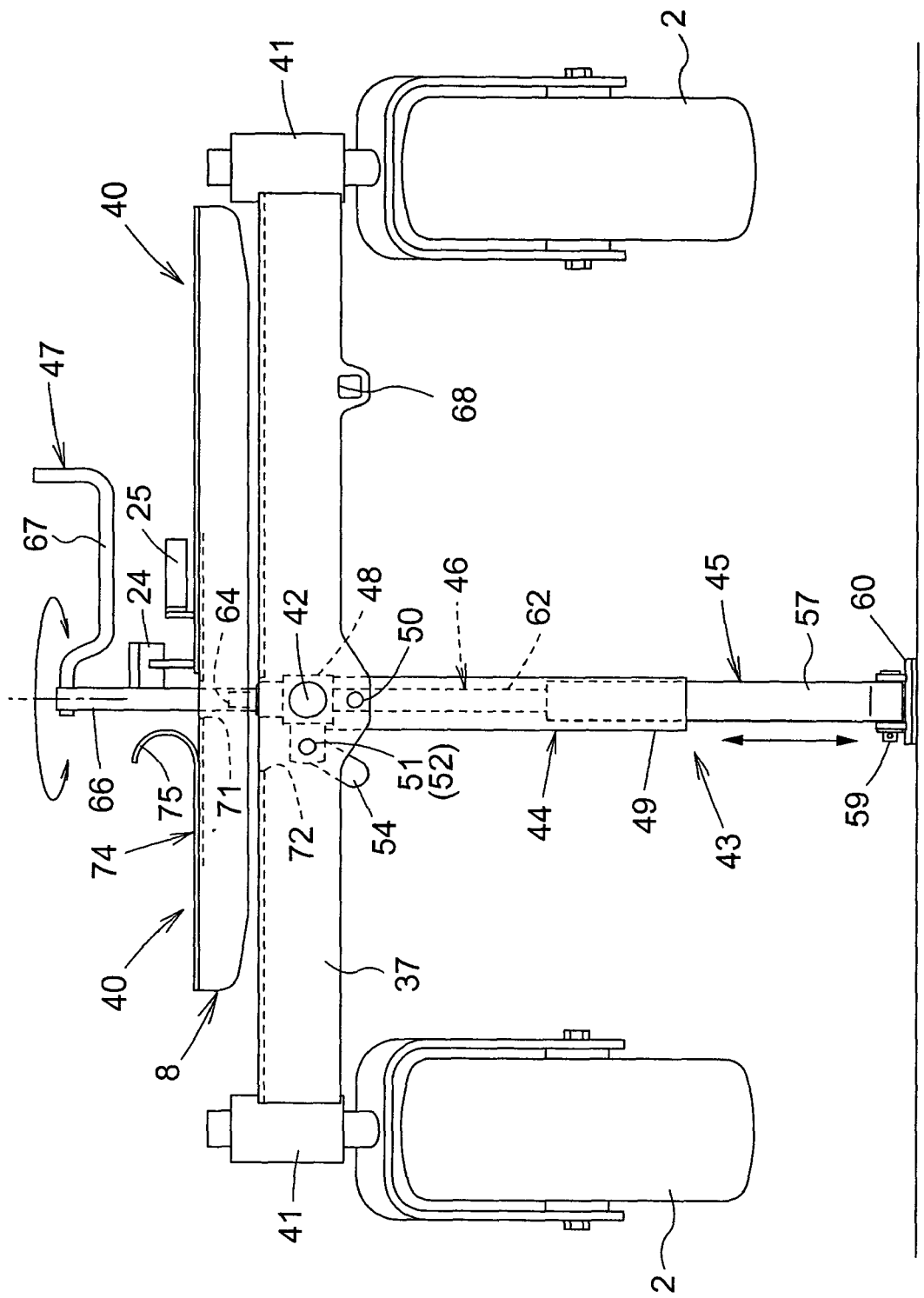
FIG. 7 is a front view showing the lower portion of the vehicle body with the jack switched and extended to an operative position.
Figure 8:
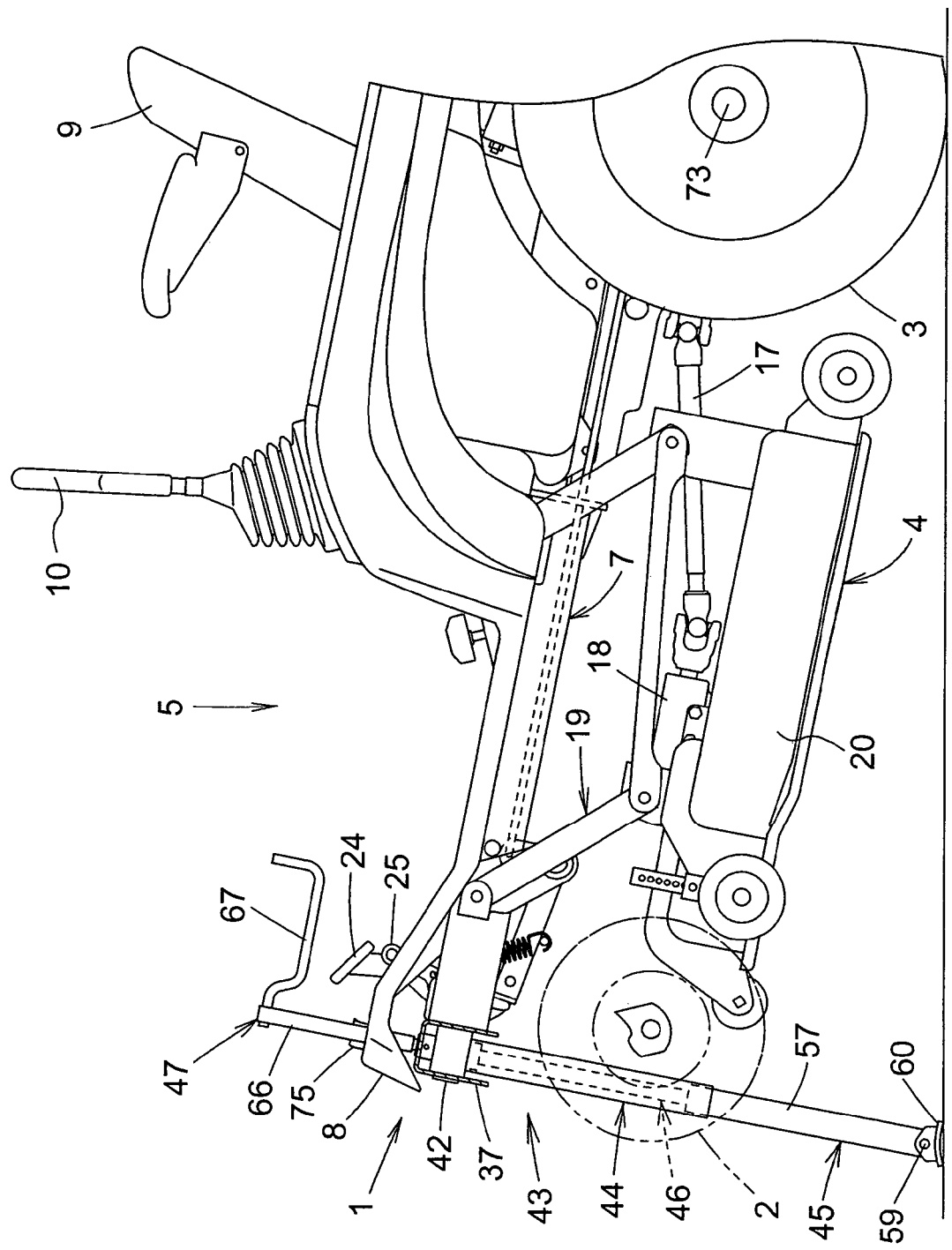
FIG. 8 is a side view showing a forward portion of the mower with the jack switched and extended to the operative position.
Figure 9:
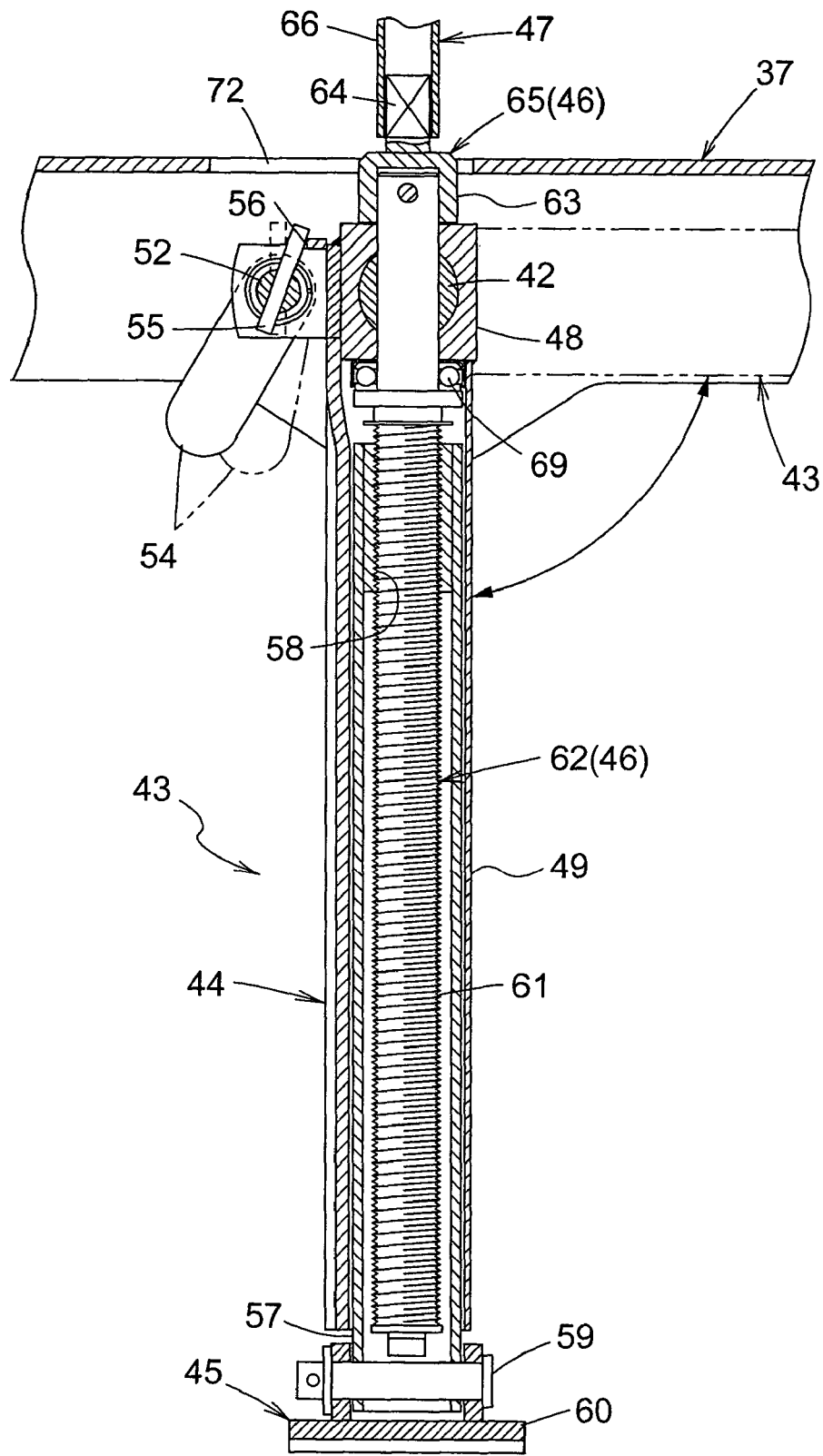
FIG. 9 is a front view, in vertical section, showing details of the jack.
Figure 10:
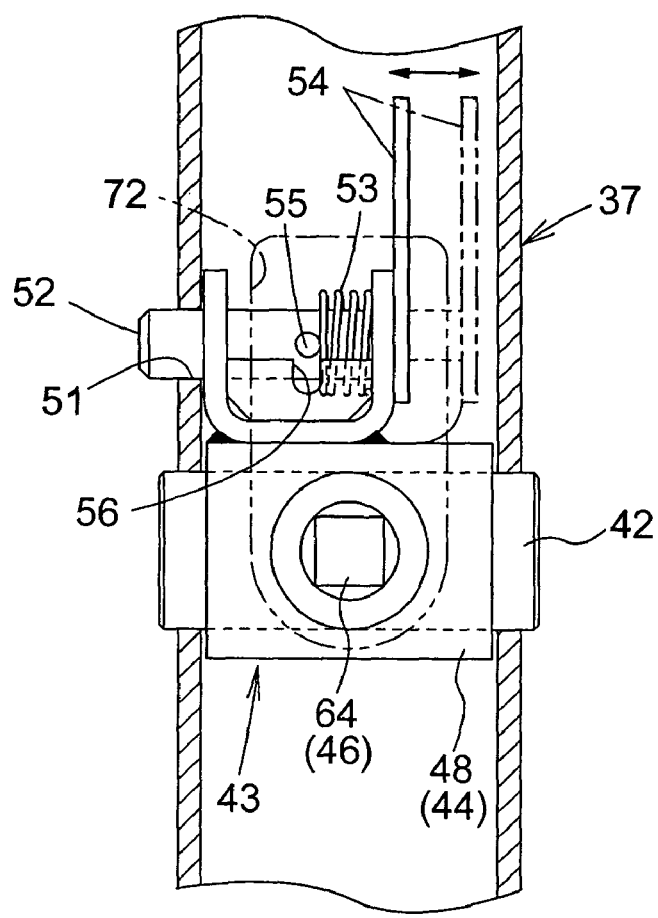
FIG. 10 is a plan view, in cross section, showing a positioning structure of the jack
Figure 11:
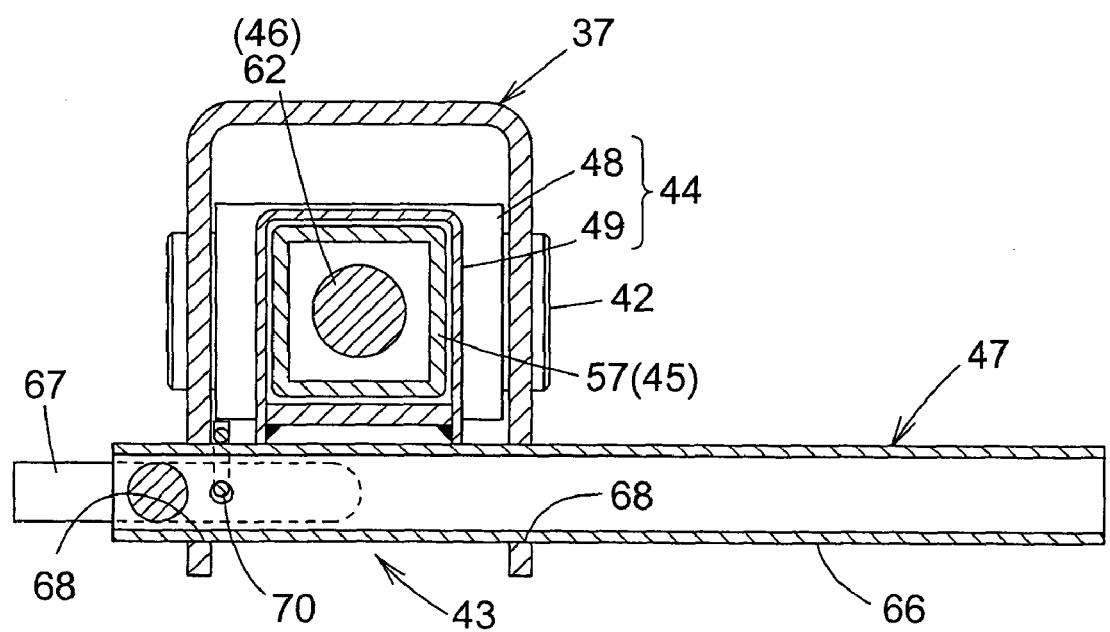
FIG. 11 is a side view, in vertical section, of the jack held in the storage position by a control device.

As shown in FIGS. 5, 7 and 8, when the control device 47 is attached to the controlled portion 46 of the jack 43 in the operative position, the brake pedal 24 in the non-braking position interferes with the control handle 67, but the brake pedal 24 in the braking position does not interfere with the control handle 67.

That is, the control device 47 of the jack 43 may be turned to raise the front of the running vehicle 1 only when the brake pedal 24 is held in the braking position by the lock pedal 25 to park the vehicle. This prevents an inadvertent movement of the vehicle body 1 caused by neglecting to put on the brakes, when the front part of the vehicle body 1 is raised by the jack 43.

In the mower described above, the right and left front wheels 2 are fixedly disposed, considering the length and position of the blades 21 arranged in the mower unit 4, within areas where the blades 21 in the mower unit 4 may easily cut grass treaded by the front wheels 2. However, the mower unit 4 sometimes needs to be replaced with one of different cutting width, depending on the length or number of the blades 21. If such replacement is carried out with the above mower having the right and left front wheels 2 fixed thereto, the right and left front wheels 2 may be outside proper areas for the blades 21 of the new mower unit 4 to easily cut grass treaded by the right and left front wheels 2. This results in a poor cutting performance.

Figure 12:
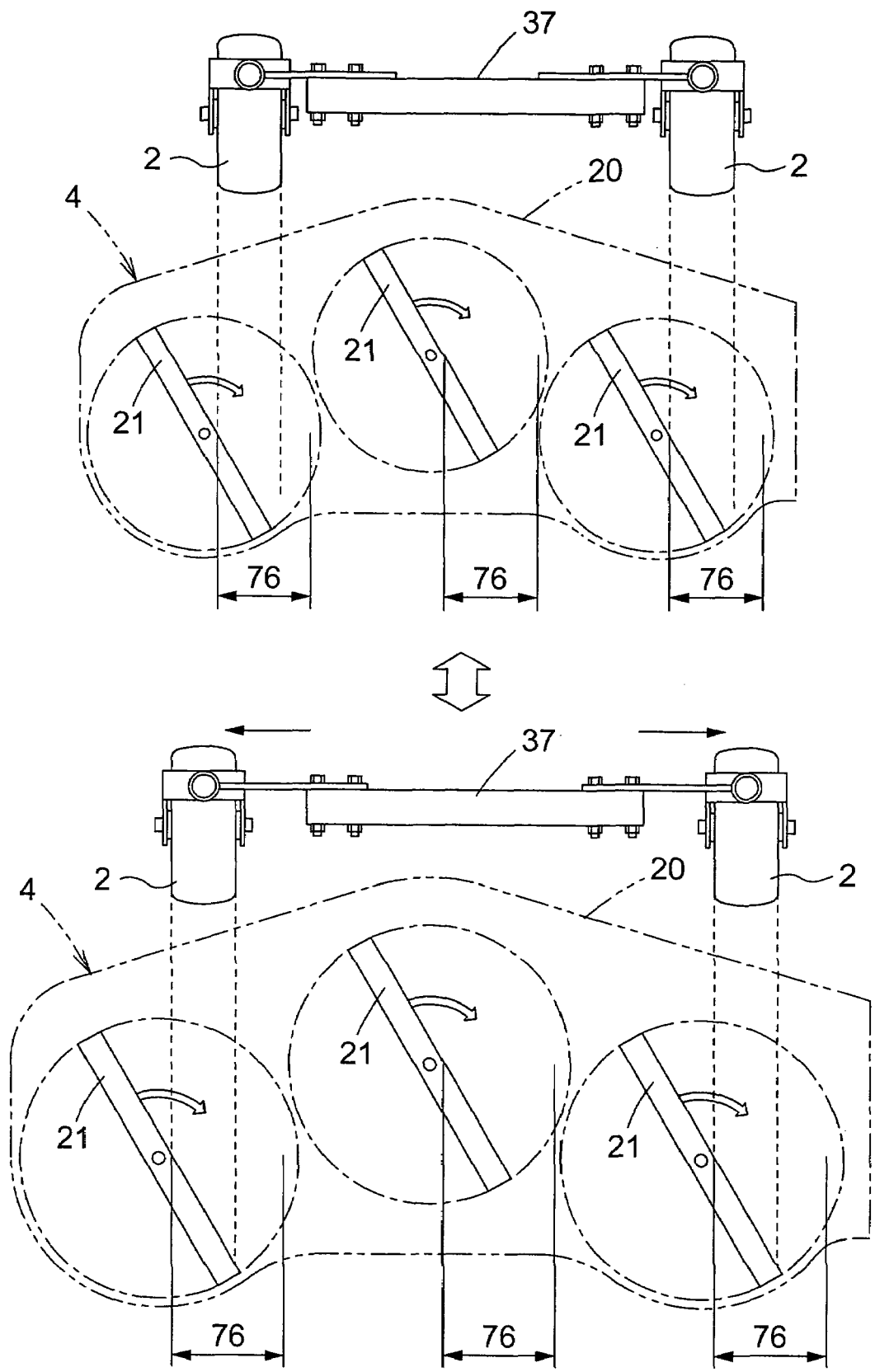
FIG. 12 is a schematic plan view showing a construction for mounting front wheels in varied positions.

Thus, as shown in FIG. 12, the front wheels 2 may be mounted so as to be independently and easily movable, in the right and left directions relative to the front frame 37, into such areas 76 of the mower unit 4 that the blades 21 may easily cut grass treaded by the front wheels 4, thereby eliminating the possibility of a poor cutting performance resulting from a replacement of mower unit 4.

The upper diagram of FIG. 12 shows a state of having the right and left front wheels 2 disposed within proper areas 76 relative to a mower unit 4 having three relatively short blades 21 (areas of the mower unit 4 where the blades 21 may easily cut grass treaded by the right and left front wheels 2). The lower diagram of FIG. 12 shows a state of having the right and left front wheels 2 disposed within proper areas 76 relative to a mower unit 4 having three relatively long blades 21.

OTHER EMBODIMENTS

Other embodiments of the invention will be described hereunder:

(1) The front frame 37 may extend between right and left longitudinal frames of the body frame 7, without having bosses 41 for supporting the front wheels 2. In this case, the bosses 41 for supporting the front wheels 2 may be disposed on the front ends of the right and left longitudinal frames.

(2) In the storage position, the jack 43 may be attached to the front frame 37 so that the jack 43 is directly forwardly or rearwardly positioned along the front frame 37.

(3) A lock lever may be employed as a lock device 25 to be gripped for operation.

What is claimed is:

1. A mid-mount mower having a mower unit disposed between front wheels and rear wheels, comprising:
   a body frame supported above the ground by said front wheels and rear wheels, said body frame having a front cross frame in a forward portion thereof with respect to a longitudinal direction of a vehicle body;
   a main jack body mounted on the front cross frame to be pivotable about a pivot shaft extending longitudinally of the vehicle body, said main jack body being in a storage position extending along said front cross frame when pivoted to a first pivot position about said pivot shaft, and in a substantially vertical position relative to the ground when pivoted to a second pivot position about the pivot shaft, said main jack body being extendible and contractible, in said vertical position relative to the ground, to raise and lower said front cross frame when an operating force is applied to a controlled portion of the main jack body;
   a brake pedal disposed in a forward portion of the body frame to be movable between a braking position and a non-braking position; and
   a lock device for holding the brake pedal in said braking position;
   wherein said brake pedal in said non-braking position blocks operation of said control device engaged with said controlled portion of the main jack body in said vertical position relative to the ground.

2. A mid-mount mower as defined in claim 1, wherein said controlled portion is upwardly exposed when said main jack body is in said vertical position relative to the ground, said mid-mount mower further comprising a control device for engaging said upwardly exposed controlled portion of the main jack body, and for extending and contracting said main jack body through said controlled portion.

3. A mid-mount mower as defined in claim 2, wherein said controlled portion of the main jack body in said vertical position relative to the ground is upwardly exposed through an opening formed in said front cross frame.

4. A mid-mount mower as defined in claim 1 further comprising a link member interlocked to movement of said brake pedal, said link member blocking operation of said control device engaged with said controlled portion of the main jack body in said vertical position relative to the ground, when said brake pedal is in the non-braking position.

5. A mid-mount mower as defined in claim 1, wherein said lock device is formed as a lock pedal, said brake pedal and said lock pedal being arranged side by side around a central area of said cross frame.

6. A mid-mount mower as defined in claim 2, wherein said main jack body in the first pivot position is contained in said front cross frame, said control device held by said cross frame holding said main jack body in said storage position.

7. A mid-mount mower having a mower unit disposed between front wheels and rear wheels, comprising:
a body frame supported above the ground by said front wheels and rear wheels, said body frame having a front cross frame in a forward portion thereof with respect to a longitudinal direction of a vehicle body; and
a main jack body mounted on the front cross frame, said main jack body being in a storage position when in a first shift position, and in a substantially vertical position relative to the ground when in a second shift position;
said main jack body being extendible and contractible, in said vertical position relative to the ground, to raise and lower said front cross frame when an operating force is applied to a controlled portion of the main jack body; and
a brake pedal disposed in a forward portion of the body frame to be movable between a braking position and a non-braking position;
wherein, when said brake pedal is in the non-braking position, said brake pedal or a link member interlocked to movement of said brake pedal blocking operation of said control device engaged with said controlled portion of the main jack body is in said vertical position relative to the ground.

8. A mid-mount mower as defined in claim 7, wherein said controlled portion is upwardly exposed when said main jack body is in said vertical position relative to the ground, said mid-mount mower further comprising a control device for engaging said upwardly exposed controlled portion of the main jack body, and for extending and contracting said main jack body through said controlled portion.

9. A mid-mount mower having a mower unit disposed between front wheels and rear wheels, comprising:
a body frame supported above the ground by said front wheels and rear wheels, said body frame having a front cross frame in a forward portion thereof with respect to a longitudinal direction of a vehicle body, said front cross frame suspending said front wheels;
a main jack body mounted on the front cross frame to be pivotable about a pivot shaft extending longitudinally of the vehicle body, said main jack body being in a storage position extending along said front cross frame when pivoted to a first pivot position about said pivot shaft, and in a substantially vertical position relative to the ground with one end of said main jack body contacting the ground when pivoted to a second pivot position about the pivot shaft; and
a brake pedal disposed in a forward portion of the body frame to be movable between a braking position and a non-braking position; and a lock device for holding the brake pedal in said braking position;wherein said brake pedal in said non-braking position blocks operation of said control device engaged with said controlled portion of the main jack body in said vertical position relative to the ground;
wherein when an operating force is applied to a controlled portion of the main jack body in said vertical position relative to the ground, said main jack body is extendable and contractible to raise and lower said front cross frame while maintaining said front cross frame in a substantially parallel posture relative to the ground.

10. A mid-mount mower as defined in claim 9, wherein said controlled portion is upwardly exposed when said main jack body is in said vertical position relative to the ground, said mid-mount mower further comprising a control device for engaging said upwardly exposed controlled portion of the main jack body, and for extending and contracting said main jack body through said controlled portion.

11. A mid-mount mower as defined in claim 10, wherein said controlled portion of the main jack body in said vertical position relative to the ground is upwardly exposed through an opening formed in said front cross frame.

12. A mid-mount mower as defined in claim 10, wherein said main jack body in the first pivot position is contained in said front cross frame, said control device held by said cross frame holding said main jack body in said storage position.

13. A mid-mount mower as defined in claim 9, wherein said lock device is formed as a lock pedal, said brake pedal and said lock pedal being arranged side by side around a central area of said cross frame.

14. A mid-mount mower as defined in claim 9 further comprising a link member interlocked to movement of said brake pedal, said link member blocking operation of said control device engaged with said controlled portion of the main jack body in said vertical position relative to the ground, when said brake pedal is in the non-braking position.

15. A mid-mount mower as defined in claim 14, wherein said lock device is formed as a lock pedal, said brake pedal and said lock pedal being arranged side by side around a central area of said cross frame.

* * * * *